(12) United States Patent
Derscheid

(10) Patent No.: US 8,925,287 B2
(45) Date of Patent: Jan. 6, 2015

(54) ARRANGEMENT ON BALER FOR ERGONOMIC LOADING OF BALE WRAPPING MATERIAL ROLLS

(75) Inventor: Daniel Eric Derscheid, Hedrick, IA (US)

(73) Assignee: Deere & Company, Moline, IL (US)

( * ) Notice: Subject to any disclaimer, the term of this patent is extended or adjusted under 35 U.S.C. 154(b) by 1184 days.

(21) Appl. No.: 12/407,352

(22) Filed: Mar. 19, 2009

(65) Prior Publication Data
US 2010/0236427 A1  Sep. 23, 2010

(51) Int. Cl.
*A01F 15/07* (2006.01)

(52) U.S. Cl.
CPC .................................. *A01F 15/0715* (2013.01)
USPC ................ 53/168; 53/118; 53/587; 53/389.4

(58) Field of Classification Search
CPC ..................... A01F 15/0715; A01F 2015/0715; A01F 15/08
USPC .......... 53/118, 211, 389.1, 389.2, 389.3, 587, 53/168, 389.4; 242/312, 337, 441.4, 242/564.5, 564.4; 56/341; 100/5, 87, 88, 100/912
See application file for complete search history.

(56) References Cited

U.S. PATENT DOCUMENTS

| | | | |
|---|---|---|---|
| 2,989,172 A * | 6/1961 | Stoll | 100/912 |
| 3,007,650 A * | 11/1961 | Burton | 242/560.1 |
| 4,185,442 A * | 1/1980 | Johnson et al. | 53/168 |
| 4,691,503 A * | 9/1987 | Frerich | 53/587 |
| 4,956,959 A | 9/1990 | Rumph et al. | |
| 4,956,960 A * | 9/1990 | Anstey et al. | 53/118 |
| 5,181,368 A * | 1/1993 | Anstey et al. | 53/587 |
| 5,692,365 A * | 12/1997 | Meyer et al. | 53/587 |
| 5,979,141 A * | 11/1999 | Phillips | 53/389.2 |
| 5,996,307 A * | 12/1999 | Niemerg et al. | 53/118 |
| 6,247,291 B1 * | 6/2001 | Underhill | 53/118 |
| 6,272,816 B1 * | 8/2001 | Viaud et al. | 53/587 |
| 7,237,372 B2 * | 7/2007 | Chapon et al. | 53/587 |
| 7,322,167 B2 * | 1/2008 | Chapon et al. | 53/389.2 |
| 7,430,959 B2 * | 10/2008 | Routledge | 100/87 |

FOREIGN PATENT DOCUMENTS

EP  1099366 A1  5/2001

OTHER PUBLICATIONS

European Search Report received Jun. 21, 2010 (5 pages).

* cited by examiner

*Primary Examiner* — Stephen F Gerrity

(57) ABSTRACT

A baler for forming large cylindrical bales of crop material is equipped with a wrapping mechanism at the rear side of the baling chamber for introducing wrapping material into the baling chamber for wrapping the cylindrical bales. A storage bin for storing extra rolls of wrapping material extends vertically above the wrapping mechanism and contains a plurality of extra rolls of wrapping material. The storage bin is mounted for pivoting about a connection at a lower end region of the bin so that the bin may be lowered to a loading position in which roll compartments of the bin are at a height commensurate with that of the waist of an average adult person standing on the ground so that supply rolls may be easily moved from these compartments to an operating position within the wrapping mechanism and new rolls may be used to replenish the rolls used from these compartments without an operator having to lift the rolls above his or her waist.

16 Claims, 4 Drawing Sheets

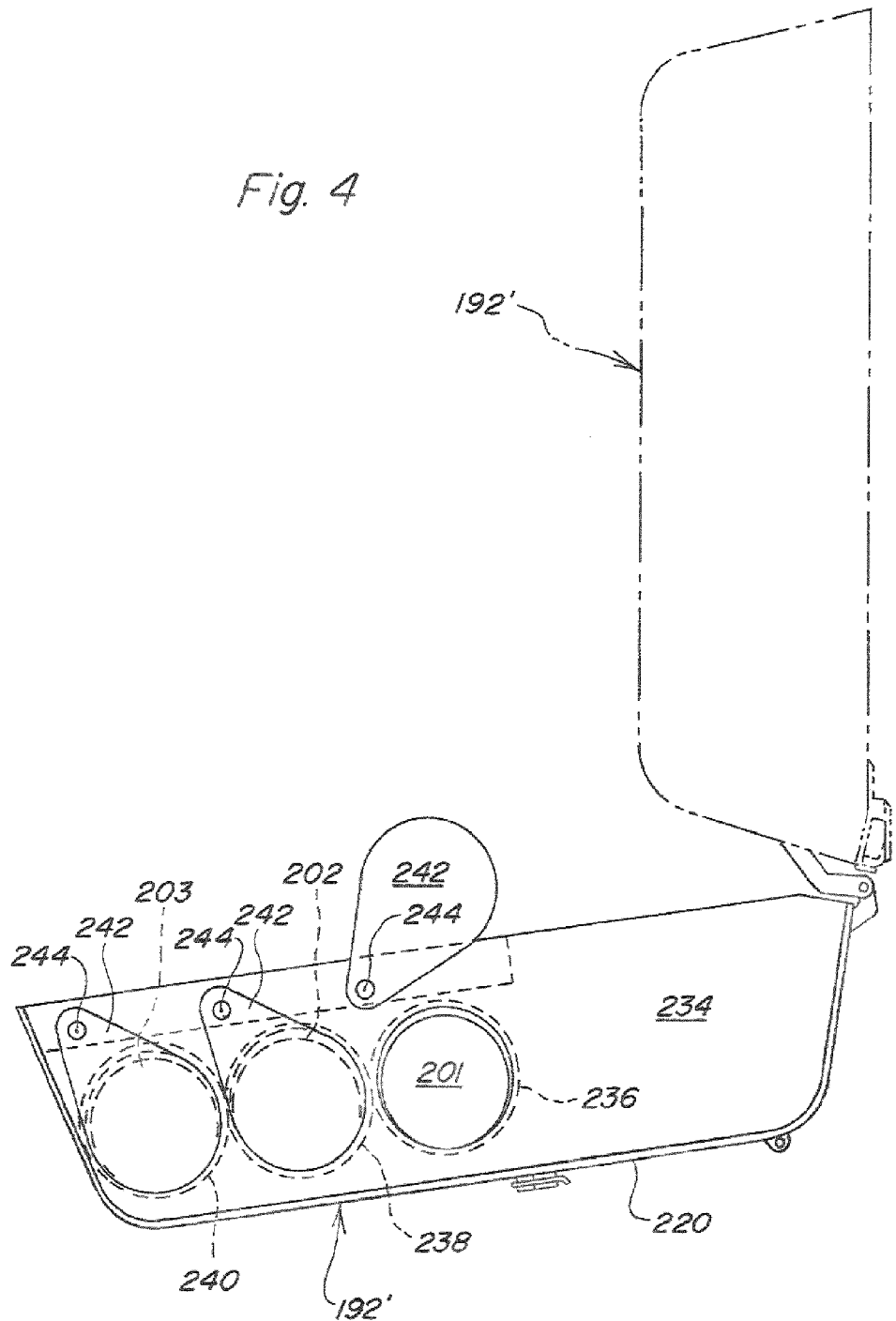

ARRANGEMENT ON BALER FOR ERGONOMIC LOADING OF BALE WRAPPING MATERIAL ROLLS

FIELD OF THE INVENTION

The present invention relates to storage of wrapping material rolls on balers for producing large cylindrical bales, and more specifically relates to a storage arrangement which can be easily loaded.

BACKGROUND OF THE INVENTION

Net wrap and solid plastic wrap, or the like, are provided in full bale width sheets that are rolled in cylindrical rolls for storage and feeding into wrapping systems forming an integral part of balers for making large cylindrical bales. It is desired that the rolls of wrap material contain a sufficient length of the material to wrap a sufficient number of bales in order to avoid time consuming loading of wrap material supply rolls to replenish used wrap material during baling operation. Further, large rolls or storage of multiple small rolls of wrap material on the baler is desired in order for an operator to be able to bale an entire day without having to fetch more rolls of wrap material. Commercially, net wrap rolls vary in weight from 80-100 lbs. which are difficult to lift. Based upon the design and location of the wrapping devices on the baler, the rolls of wrap material have to be lifted to a height of three to four feet above the ground, which height is approximately that of the waist of an average adult person and often has to be lifted to a height above the shoulder of such a person. Trends are tending to continue to increase roll weight and demand increased on-baler storage due to increased productivity of the round balers.

There are some devices available that aid in reducing the stress of lifting rolls of wrapping material into operation and/or storage locations; Examples of these are disclosed in U.S. Pat. No. 7,430,959 (baler equipped with wrap roll lifting winch), U.S. Pat. No. 5,996,307 (wrap roll storage trough mounted for pivoting and powered movement from a lowered storage position to a raised position wherein stored roll is loaded into a work position) and U.S. Pat. No. 4,691,503 (cover for wrap material delivery mechanism pivotable to a lowered open position at a level for receiving, with minimal lifting, a replacement roll of wrap material carried in the bed of a pick-up truck, or the like.

The problem to be solved then is the provision on a large round baler of a sufficient supply of wrap material rolls for operating the baler for an entire day and to provide a storage arrangement into which supply rolls of wrapping material may be easily loaded without undue lifting and from which it is convenient to transfer stored rolls for use in the baler wrapping mechanism.

SUMMARY OF THE INVENTION

According, to the present invention/there is provided a novel wrapping material supply roll holder for a baler for forming large cylindrical bales.

An object of the invention is to provide a wrapping material supply roll holder which can be easily loaded with a sufficient number of supply rolls for wrapping all of the bales formed during an entire day of baling, and with the stored rolls being located for being conveniently transferred from a storage location to an operating location.

The foregoing object is achieved by providing a wrap material supply roll storage holder for holding a plurality of wrap material supply rolls in a vertical arrangement when the holder is disposed in a vertical storage position above a wrap material feed mechanism at the rear of the baling chamber, with a lower end location of the holder being pivotally coupled to the baling chamber for permitting the holder to be pivoted to a loading position in which it extends rearward from the rear of the baling chamber at a height of three to four feet above the around, which height is commensurate to that of the waist of an average adult person.

BRIEF DESCRIPTION OF THE DRAWINGS

FIG. 4 is a right side elevational view of an alternate embodiment of the housing shown in solid lines in a lowered loading position and with an outline of the housing being shown in a raised working position.

DESCRIPTION OF THE PREFERRED EMBODIMENT

Figure 1:
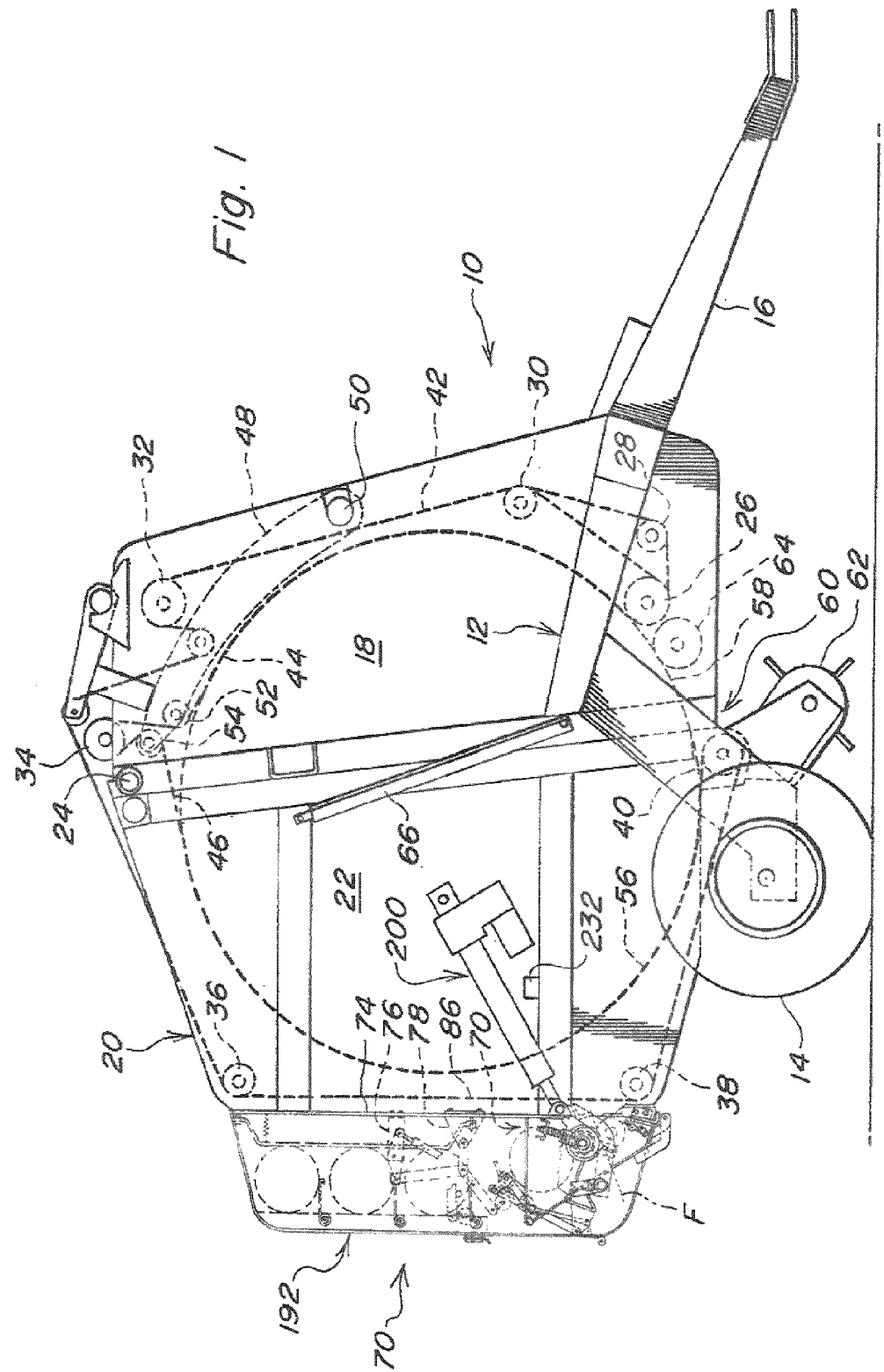
FIG. 1 is a right side elevational view of a large round baler equipped with a wrap material feed mechanism and with a wrap material roll storage structure constructed in accordance with a first embodiment of the present invention and shown in a raised working position.

Referring how to FIG. 1, there is shown a baler 10 for making large cylindrical bales and commonly called a large round baler. The baler 10 comprises a main frame 12 supported on a pair of ground wheels 14. Joined to, and projecting forwardly from the frame 12 is a draft tongue 16 having a forward end adapted for being coupled to a towing vehicle such as an agricultural tractor, not shown. A pair of transversely spaced, vertical side walls 18 are joined to the frame 12 and have respective upright rear ends. A bale discharge gate 20, including opposite side walls 22, is vertically pivotally attached, as at 24, to upper rear locations of the side walls 18, the side walls 22 having upright forward ends which abut the rearward ends of the side walls 18 when the gate 20 is in a lowered closed position, as shown.

Arranged about the periphery of, and extending between the side walls 18 and 22 are a plurality of bale-forming belt support rolls having their opposite ends rotatably supported in bearings, not shown, carried by the side, walls. Specifically, beginning at a lower central location of, and proceeding counterclockwise to an upper rear location of, the side walls 18 are mounted a driven roll 26, a lower front roll 28, an intermediate front roll 30, an upper front roll 32, and an upper rear roll 34. Continuing counterclockwise from an upper rear location of the gate side walls 22, there is mounted an upper rear roll 36, a lower rear roll 38, and a lower front roll 40. Located between the pairs of side walls 18 and 22 and supported in side-by-side relationship to one another across the various belt support rolls are a plurality of endless bale-forming belts 42. Except for some of the belts 42 which skip the lower front roll 28, the belts 42 are trained so that they serially engage the rolls 26, 28, 30, 32, 36, 38, 40 and 34. A front run 44 of the belts 42 extends upwardly from the driven roll 26 to the roll 34.

Similarly, a rear run 46 of the belts 42 extends upwardly from the lower front gate roll 40 to the roll 34. Mounted between rear end locations of a pair of rearwardly extending tensioning arms 48, which are vertically pivotally mounted, as at 50, to a mid-height location at the front of the side walls 18, are closely spaced front and rear idler rolls 52 and 54, respectively, with the belt runs 44 and 46 cooperating with the side walls 18 and 22 to define an expansible baling or bale-forming chamber 56, closed at its top by the idler rolls 52 and 54, and here shown in a state of considerable expansion and containing a bale 58. When the chamber 56 is empty, the front and rear belt runs 44 and 46, respectively, converge upwardly from the drive roll 26 and the lower front gate roll 40 and pass closely to each other between the rolls 52 and 54, the chamber 56 thus being wedge-shaped as viewed from the side. The bottom of the chamber 56 is provided with a crop inlet 60 extending between the driven roll 26 and the lower front gate roll 40. Crop products are introduced into the inlet 60 by a pick-up 62 for being rolled into a bale, such as the bale 58, by the action of the front and rear belt runs 44 and 46, which are respectively driven so as to travel towards and away from the inlet, and initially also by a starter roll 64 rotatably mounted to the side walls 18 adjacent to, and being driven in the same direction as, the driven roll 26 so that it operates to strip crop being carried downwardly by the front run of the belts 44. As the bale 58 is being formed, the chamber 56 yieldably expands to a predetermined size, as shown, against a force established in the belts by a tensioning system including the pair of tensioning arms 48 together with a pair of tensioning springs (not shown) and a pair of hydraulic cylinders (also not shown) coupled between the walls 18 and the arms 48 for resisting upward movement of the arms, in a manner well known in the art. A pair of hydraulic gate cylinders 66 are provided for swinging the gate 20 upwardly about the pivotal attachment 24 to an open position when it is desired to discharge the bale 58 onto the ground.

Figure 2:
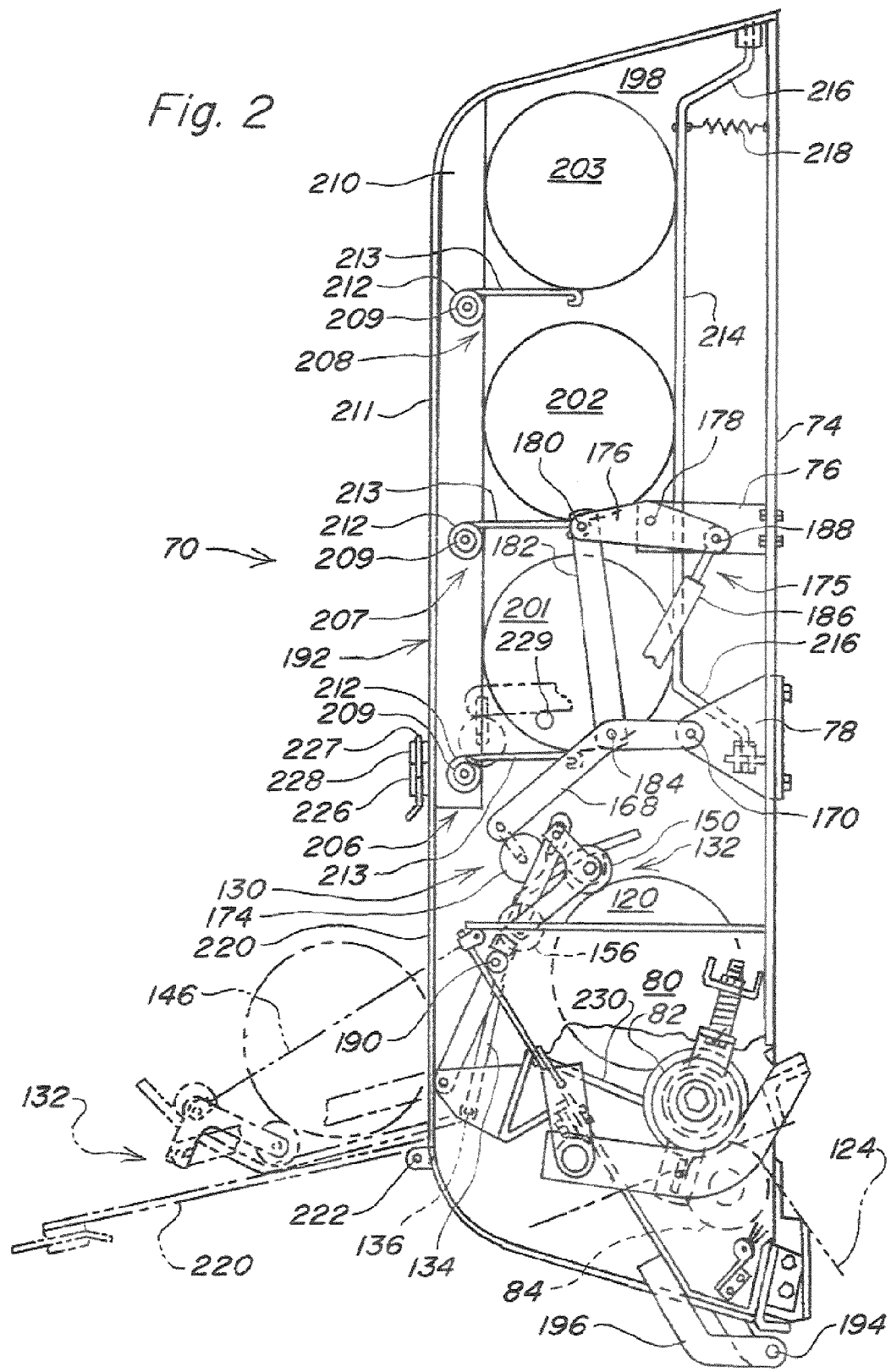
FIG. 2 is an enlarged fight side elevational view of the web wrap material dispensing apparatus shown in FIG. 1, but showing a near side wall of the housing removed and a near side wall of the support structure removed for clarity, with the housing being shown in solid lines in an upright, closed position and with the housing and lower arm portion each being shown in broken lines in lowered loading positions.

Referring now also to FIG. 2, a web wrap material dispensing apparatus 70 is shown mounted to a rear end of the discharge gate 20 for wrapping bales, such as the bale 58, formed in the baling chamber 56 prior to the bale being discharged onto the ground. It is to be noted that the apparatus 70 is designed for dispensing a web of net material having a width greater than the width of the baling chamber 56 for being fed into the baling chamber 56 in a way, not disclosed in detail, that results in the net material becoming wrapped over the end corners of the bale 58.

Specifically, the apparatus 70 includes a support structure, mounted to the rear end of the gate 20, comprising a vertical panel 74 extending transversely across, and being fixed to, vertical flanges respectively defining rear ends of the opposite side walls 22 of the gate. Bolted to a mid-height region of the panel 74 are respective transverse legs of a pair of angular, crank arm support brackets 76. Spaced vertically below the pair of support brackets 76 and having transverse legs bolted to the panel 74 are a pair of angular, biasing arm support brackets 78. The support structure of the wrapping apparatus 70 further includes a pair of longitudinally extending, vertical support walls 80 which are approximately right-triangular in side view and have forward vertical sides defined by transverse flanges that overlap a lower portion of the panel 74 and are secured, as by threaded fasteners, not shown, to structure at the rear of the gate 20 so as to be spaced transversely from each other by a distance greater than the distance between the gate side walls 22, i.e., greater than the width of the baling chamber 56.

Extending between and having their opposite ends rotatably mounted in bearings carried by the support walls 80 are upper and lower wrap material feed rolls 82 and 84, respectively, with the rotational axis of the roll 82 being disposed above and to the rear of the axis of the roll 84 such that a planar wrap material flight path F is disposed tangentially to the rolls at their bite or nip, and extends upwardly and forwardly form the nip and below the panel 74. Referring back to FIG. 1, it will be appreciated that the material flight path F intersects a vertical run 86 of the belts 42 extending between the upper and lower support rolls 36 and 38, respectively, at a location above a nip or bite defined by a net material guide pan portion forming part of a wrap material guide assembly (not shown), and a portion of the belts 42 engaged with the lower rear belt support roll 38. The upper wrapping material feed roll 82 is mounted for movement toward and away from, and is biased into engagement with, the lower feed roll 84 by structure well known in the art and not further described.

An active net material supply roll 120 is shown positioned in direct contact with the driven upper feed roll 82. A length of net material 124 extends from a lower forward location of the supply roll 120 about the rearward half of the upper feed roll 82, and then through the nip or bite of the feed rolls 82 and 84. In FIG. 2, the length of net material 124 continues on from the feed rails 82 and 84 and is positioned as it would be when a bale is being wrapped, i.e., it engages a portion of an upper forward quadrant of the lower feed roll 84 and extends into the nip defined by the bale-forming belts 42 and the not shown wrapping material guide pan portion of the material guide assembly.

A pressure arm assembly is provided for applying a near constant force to the active net material supply roll 120 for urging it against the upper feed roll 82 so as to establish a desired frictional resistance to the force tending to pull the net from the roll during wrapping of a bale. Specifically, the pressure arm assembly includes separate upper and lower arm sections 130 and 132, respectively.

The lower arm section 132 includes a pair of transversely spaced lower arm portions 134 having lower ends mounted by pins 136 establishing a horizontal pivot axis in brackets fixed to central rear locations of rear edges of the support walls 80, the height of the axis being approximately that of the axis of rotation of the upper feed roll 82. The lower arm portions 132 are constructed from formed straps or narrow plates which, with respect to the pivot axis, have an angled upper end section which is inclined upwardly and forwardly when the arm section 132 is in its raised working position, as shown in solid lines. When the arm portions 134 are rotated to a rearwardly extending loading position, as shown in broken lines, they form a cradle for holding a replacement roll of wrapping material, as shown in broken lines in FIG. 2. With the wrap material roll in the loading position, a length of wrapping material 124 may be easily pulled off the roll and manually fed through the nip of the feed rolls 82 and 84. Extending between the upper rear corner of each support wall 80 and the associated arm portion 134 is a flexible support member 146, which becomes taut and supports the lower arm section 132 when it is in the loading position. The lower arm section 132 includes a pressure roller 150 extending between, and rotatably coupled to locations adjacent outer free ends of the arm potions 134 and positioned so that it engages the periphery of the active supply roll 120 at a location approximately diametrically opposite from the zone of contact of the roll 120 with the upper net wrap feed roll 82. Coupled to each of the arm portions 134 of the lower arm section 132 at a position behind the supply roll 120 is a containment or retainer roll 156. The retainer rolls 156 are located so as to be in engagement with, or at least in close proximity to, the wrap material supply roll 120 as the arm portions 134 of the lower arm section 132 pivot forwardly as the diameter of the material supply roll 122 diminishes during wrapping operations, the function of the rolls 156 being to make sure that the supply roll is kept from being propelled from its desired location in engagement with the upper feed roll 82 during initial engagement of the drive to the feed roll 82.

The upper arm section 130 comprises a pair of transversely spaced, rearwardly projecting upper arm portions 168 having rear ends respectively vertically pivotally mounted to the pair of brackets 78, as at bolts 170, and having force-applying rollers 174 mounted to their rear ends. The rollers 174 are respectively engaged with upper surface portions of the lower arm portions 134 when the arm assembly 126 is in a working condition, as shown in solid lines in FIG. 2. The geometry of the upper and lower arm sections 130 and 132, respectively, is such that, as the weight of the active supply roll 120 diminishes, the force urging the roll 120 against the feed roll 82 increases in an amount which results in the force remaining substantially constant, thereby maintaining a substantially constant tension in the wrap material 124 as it is being wrapped about a bale located in the baling chamber.

A lever and linkage assembly 175 forms part of a force mechanism for urging the upper arm portions 130 downwardly and includes a fore-and-aft extending lever 176 pivotally coupled, as by a pin 178 located about half way between opposite ends of the lever, to each bracket 76. Coupled to the rear end of each lever 176, as by a pin 180, is the upper end of a force transfer link 182 having its lower end coupled, as by a pin 184, to the adjacent upper arm portion 168 at a location spaced rearwardly from the pin 170 by a distance approximately one third of the distance between the pin 170 and the roller 174. A rod end of a gas cylinder or strut 186 is coupled to a forward end of each of the levers 176 by a pin 188, with the cylinder end of the cylinder 186 being coupled to an upper rear corner region of a respective side wall 80 by a pin 190. Thus, the cylinders 186 supply the force by which the force-applying roller 174 is pressed against the arm portion 134 of the lower arm section 132.

A housing or cover 192 has a lower front region pivotally coupled, as at pivot pins 194, to a pair of housing mounting brackets 196 extending from the support side walls 80. Coupled between each of the opposite gate side walls 22 and opposite side walls 198 of the housing 192 is an extensible and retractable powered actuator, here shown as an electric linear motor 200, which selectively moves the cover 192 between an upright closed position, shown in solid lines, and a lowered open loading position, shown in broken lines. As considered in its closed position, the housing 192 forms a storage magazine for rolls of wrapping materials, and proceeding from bottom to top, three inactive wrap material supply rolls 201, 202 and 203 are stored in a vertical arrangement above the active wrap material supply roll 120. The wrapping material constituting the three inactive supply rolls have a total length sufficient for providing wrapping for an entire day of bale production by most round balers.

The magazine for the inactive rolls 201, 202 and 203 is separated into separate compartments closed at their forward sides by the panel 74 and have bottoms closed by resiliently deflectable gates defined by respective coil spring arrangements 206, 207 and 208, each of which includes a tube 209 extending between and having opposite ends extending through and anchored to a pair of vertical rails 210 respectively fixed to a rear wall 211 of the housing 192 at respective locations behind each of opposite end regions of the inactive wrapping material supply rolls 201, 202 and 203. Received on, and secured to each of opposite end regions of tubes 209 are respective coil sections of a torsion coil spring 212, with straight sections 213 being joined to the coiled sections and extending beneath opposite ends of, and supporting an associated one of, the inactive wrapping material supply rolls 201, 202 and 203. The straight tine sections 213 may be deflected downwardly for permitting the rolls 201, 202 and 203 to be advanced downwardly when it is necessary to replace a depleted active roll 120. Located on the opposite side of the rolls 201, 202 and 203 from the support rails 210 are a pair of roll-securing rods 214 engaged with opposite end regions of each of the rolls so as to capture them against the rails 210. The roll-securing rods 214 make allowance for wrapping material rolls having varying diameters by including cranked portions 216 at opposite ends which are mounted for defining a pivot axis extending vertically when the housing 192 is closed. Each of the rods 214 is preferably biased inwardly against the rolls by a tension spring 218 coupled between the rod 214 and the adjacent housing side wall 198. The rods 214 may be pivoted with the springs 218 moving over center so as to bias the rods 214 outwardly so as to permit access to the zone occupied by the inactive rolls when it is desired to load inactive rolls into the housing 192 when replacing depleted active rolls, as described below.

In order to move the lower arm section 132 out of the way so that the lower inactive roll 201 may move into an operating position in contact with the upper feed roll 82, an access door 220 is provided in a lower region of rear wall 211 of the housing 192, the door having a hinge 222 at its bottom edge and a pair of transversely spaced, over-center latch members 226 at its fop edge, with each latch member including a pivoted loop-shaped rod 227 which is received in a complementary shaped depression provided in the top of a receiving member 228 fixed to the wall 211 just above the closed door 220. When the door 220 is pivoted to a lowered open position, as shown in broken lines, an operator may manually lift the upper arm sections 130, one side at a time, respectively to positions sufficiently high for permitting the lower arm sections 132 to be pivoted to the lowered loading position. Retractable spring loaded pins (not shown, but indicated by circle 229), are normally located on the exterior of the housing side walls 198, but may be inserted through the housing side walls 198 so as to pass beneath the upper arm portions 168 so as to retain them in a lifted position, as shown in broken lines, against the force exerted by the gas cylinders 186 and free the operator's hands for pivoting the lower arm sections 132 to the loading position. Once the arm sections 132 are lowered, the operator may unwind sufficient wrap material from the supply roll 201 and manually feed it into the nip of the feed rolls 82 and 84, then the roll 201 may be pulled downwardly with a force sufficient to deflect the straight portions 213 of the pair of coil torsion springs 212 of the lower spring assembly 206 downwardly and deflect the roll-securing rods 214 inwardly so that the roll 201 may drop onto a support plate 230 which extends between, and is fixed to, the side walls 80, the plate being inclined downwardly toward a center location of the feed roll 82. The rolls 202 and 203 may subsequently be respectively moved down into the positions previously occupied by the supply rolls 201 and 202 by deflecting the springs associated with them downwardly and the roll securing rods 214 inwardly.

When all four of the illustrated rolls of wrapping material are depleted, a first new roll of wrapping material may be loaded for becoming an active roll by opening the door 220, raising and securing the upper arm sections 130 out of the way, as described above, and lowering the lower arm sections 132 to the loading position, described above. The first new roll of wrapping material may then be placed within the cradle defined by the lower arm sections 132, as shown in broken lines. It is to be noted that this cradle is located approximately waist high of an average adult person, or in the range of from 36"-48". A length of wrapping material 124 is then pulled off the first new roll and manually inserted into the nip of the feed rolls 82 and 84. The lower arm sections 132 are then moved to their raised position depositing the first new roll of wrapping material onto the support plate 230, with the pressure roll 150 coming into engagement with the newly loaded active roll of wrapping material The upper arm sections 130 are then released, resulting in the rolls 174 coming info pressure-transferring engagement with the lower arm sections 132. The door 220 is then closed and secured in place by the latch members 226. Wrapping material may then be loaded into the housing 192 by actuating the electric motor 200 causing it to extend to pivot the housing 192 downwardly to the loading position, shown in broken lines. So that this may be done conveniently without the operator having to go to the towing tractor, a control switch 232 for the motor 200 is provided on the gate side wall 22. Once the housing 192 is lowered, the roll securing rods 214 are manually pivoted upwardly until the springs 218 move over center and hold the rods 214 out of the way. The three new rolls of wrapping material are then appropriately placed into the housing 192, noting that this may be done by the operator without having to lift any of the rolls above his or her waist. The roll securing rods 214 are then manually pivoted inwardly until the springs 218 move over center and hold the rods 214 against the three new rolls of wrapping material.

Figure 3:
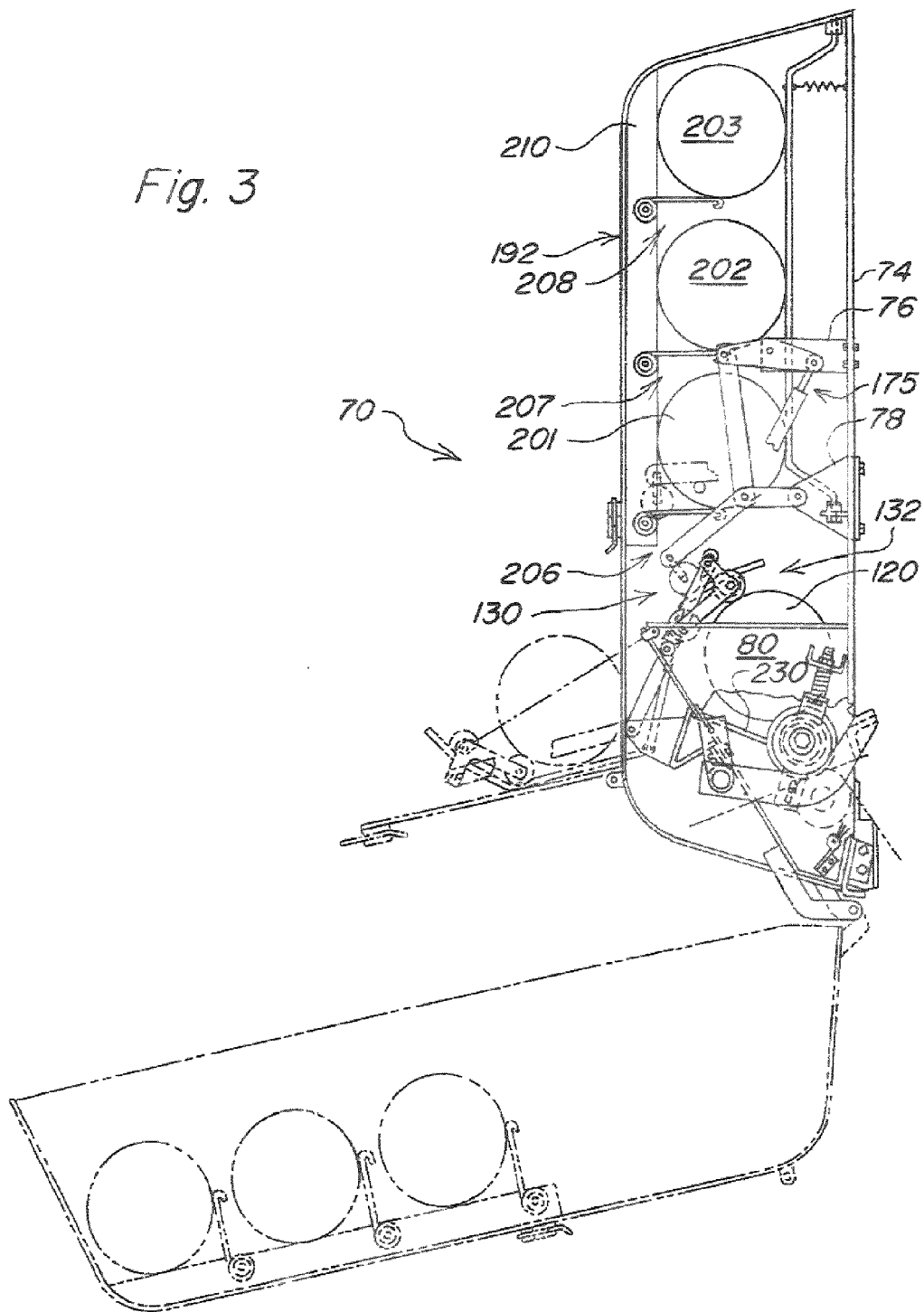
FIG. 3 is a view similar to FIG. 2, but being of a smaller scale and showing the wrap material housing in a lowered loading position in broken lines.

Referring now to FIG. 3, there is shown a housing 192', which is an alternate to the housing 192, with common reference numerals being used to indicate like parts. Molded within the housing 192' and extending between opposite side walls 234 are three tubes 236, 238 and 240 having at least one open end for permitting rolls of wrapping material 201, 202, and 203 to be inserted into and withdrawn from the tubes. A plurality of substantially teardrop-shaped covers 242 are pivotally mounted, as at pivot connections 244 to the side wall 234 containing the open ends of the tubes, for movement between a closed position, covering an open end of an associated one of the tubes, and an open position permitting wrap material rolls to be inserted into, and withdrawn from, the associated tube.

Instead of providing the tubes 236, 238 and 240, the housing 192' could be made with a molded structure defining three cradle-shaped recesses extending between the side walls 234, with access being provided from the top, as with the first described embodiment. In any event, the lower back side section of the housing 192' would be provided with an access door similar the door 220 of the previously described housing 192 for permitting the lower arm section 132 to be pivoted to its loading position, when the housing 192' is in its raised position, for receiving a wrapping material roll for being loaded into place for replacing a depleted active wrapping material roll.

Having described the preferred embodiment, it will become apparent that various modifications can be made without departing from the scope of the invention as defined in the accompanying claims.

The invention claimed is:

1. In a baler having a housing structure partially defining a baling chamber for forming large cylindrical bales and having a wrap material feed mechanism mounted to a lower rear region of the housing structure and including a pair of feed rolls and a roll support plate located rearward of said feed rolls for supporting an active roll of wrap material, with the feed rolls being selectively operable for feeding wrap material into the baling chamber from said active roll of wrap material for wrapping a bale contained therein, and a wrap material storage structure being located directly above said wrap material feed mechanism for holding an inactive roll of wrap material for use by the wrapping mechanism when an active roll has been depleted, the improvement comprising: a wrap material storage housing including at least one wrap material roll storage compartment; said wrap material storage housing having a raised working position wherein said at least one storage compartment is disposed above an active roll of wrap material supported on said roll support surface of said wrap material feeding mechanism, with said at least one roll storage compartment being adapted for holding a horizontally disposed, inactive roll of wrap material; and a coupling structure connected between a lower region of said wrap material storage housing and said housing structure for allowing said wrap material storage housing to be selectively moved between said raised working position and a lowered storage housing loading position wherein said at least one roll storage compartment is approximately at a height above the ground in the range of from three feet to four feet.

2. In the baler as defined in claim 1, wherein said wrap material storage housing includes a plurality of wrap material roll storage compartments adapted for respectively holding a plurality of inactive wrap material rolls and being disposed such that, when said wrap material storage housing is in said raised working position, adjacent storage compartments are located one above another, and when said wrap material housing is located in said lowered storage housing loading position, each of said plurality of wrap material roll storage compartments are located approximately in said range of from three to four feet above the ground.

3. The baler, as defined in claim 2 wherein said storage housing includes at least three of said roll storage compartments.

4. The baler, as defined in claim 2, wherein said storage housing defines a cover having, as considered when said storage housing is in said working position, opposite side walls joined to rear, top and bottom walls; and at least one of said side walls including a plurality of openings respectively providing access to said plurality of compartments.

5. The baler, as defined in claim 4, wherein said compartments are each defined by a cylindrical tube, with one end of each tube defining a respective one of said plurality of openings.

6. The baler, as defined in claim 5, wherein an access cover is mounted on said one of said side walls adjacent each of said plurality of openings for movement between an open position permitting access to an interior of an associated one of said tubes, and a closed position covering said opening of said associated one of said tubes.

7. The baler, as defined in claim 2, wherein a pair of upright, transversely spaced rails are fixed in said storage housing rearward of opposite end regions of the said plurality of wrap material roll storage compartments for engaging opposite end regions of inactive rolls of wrap material located in said plurality of wrap material roll storage compartments, as considered when said storage housing is in its raised working position; and a pair of transversely spaced, vertical roll-securing rods being mounted to said housing forwardly of said plurality of compartments for holding inactive wrap material rolls for pivoting about a respective vertical axis; each of said roll-securing rods having a central cranked portion; and a biasing element being coupled between each of said roll-securing rods and said storage housing and acting to bias each central cranked portion against said inactive wrap material rolls.

8. The baler, as defined in claim 2 wherein each of said compartments, as considered when said storage housing is in said storage housing loading position, includes structure defining an upwardly opening cradle; said wrap material feed mechanism including a pressure-applying arm portion pivotally mounted rearward of said support plate for said active wrap material roll for movement about a horizontal transverse pivot arrangement between a raised working position wherein a surface thereof is disposed for engaging an active roll of wrap material so as to apply a force for keeping said active roll pressed against one of said feed rolls, and a lowered loading position, wherein it is disposed for supporting an inactive roll rearward of said roll support plate, with the arm portion being constructed for depositing said inactive roll on said support plate when the arm portion is pivoted from said loading position to said working position; and said storage housing having a back wall provided with an access door mounted for movement between an open position, permitting movement of said pressure-applying arm portion between said working and loading positions when said storage housing in said working position.

9. The baler, as defined in claim 1, wherein a bottom of said at least one storage compartment includes a gate arrangement mounted for movement between a closed position disposed for contacting an underside of an inactive roll of wrap material within said at least one storage compartment, and an open position disposed for permitting the inactive roll to move downwardly past the open gate arrangement.

10. The baler, as defined in claim 9, wherein said storage housing defines a plurality of wrap material roll storage compartments which are arranged one above another when the storage housing is located in said working position; each of said plurality of wrap material roll storage compartments including a gate arrangement mounted at the bottom of the compartment for movement between a closed position wherein it engages the bottom of and supports an inactive wrap material roll located in the compartment, and an open position permitting the inactive wrap material roll to move downwardly past the gate.

11. The baler, as defined in claim 1, wherein a bottom of said at least one storage compartment includes a resilient gate which may be selectively deflected downwardly in response to applying a downward force on an inactive roll of wrap material supported by said gate, whereby said inactive roll of wrap material may be moved past said gate.

12. The baler, as defined in claim 11, wherein said resilient gate includes a pair of coil torsion spring members mounted to said storage housing and each of said pair of coil torsion spring members having a straight section normally located for supporting an end region of said inactive roll of wrap material.

13. The baler, as defined in claim 12, wherein a horizontal tube is mounted to said storage housing at a bottom of said at least one roll storage compartment, and each of said pair of coil torsion spring members including a coiled section received on and fixed to said horizontal tube and each said straight section of said coil torsion spring members being joined to a respective coiled section.

14. The baler, as defined in claim 12, wherein said storage housing encloses said wrap material feed mechanism when said storage housing is in said working position; and said storage housing being provided with an access door mounted to a remaining part of said storage housing for being moved to an open position permitting access to said wrap material feed rolls and to a bottom of said at least one compartment for permitting an operator to access an inactive roll of wrap material located in said at least one compartment and to thread an end of the wrap material of said last-mentioned inactive roll of wrap material into said feed rolls when an active roll of wrap material has become depleted.

15. The baler, as defined in claim 1, and further including an extensible and retractable power actuator assembly coupled between said housing structure of said baler and said storage housing for selectively moving the storage housing between said working and loading positions.

16. The baler, as defined in claim 15, wherein said power actuator assembly includes at least one electric motor and a motor control switch being located on said baler housing structure in the vicinity of said motor for permitting an operator to stand beside said baler and control said motor for selectively raising and lowering said storage housing.

* * * * *